US008340922B2

(12) United States Patent
Wang et al.

(10) Patent No.: US 8,340,922 B2
(45) Date of Patent: Dec. 25, 2012

(54) METHOD FOR ESTIMATING FAN LIFE

(75) Inventors: Feng-Ku Wang, Taipei (TW); Yi-Lun Cheng, Taipei (TW)

(73) Assignee: Inventec Corporation, Taipei (TW)

(*) Notice: Subject to any disclaimer, the term of this patent is extended or adjusted under 35 U.S.C. 154(b) by 296 days.

(21) Appl. No.: 12/748,774

(22) Filed: Mar. 29, 2010

(65) Prior Publication Data

US 2011/0125418 A1    May 26, 2011

(30) Foreign Application Priority Data

Nov. 25, 2009  (TW) .............................. 98140224 A

(51) Int. Cl.
*G01B 3/44*  (2006.01)
(52) U.S. Cl. ............ 702/34; 702/35; 702/113; 702/189
(58) Field of Classification Search ............... 702/33–35
See application file for complete search history.

(56) References Cited

U.S. PATENT DOCUMENTS

| | | | | |
|---|---|---|---|---|
| 6,396,688 | B1* | 5/2002 | Davies et al. ............ | 361/679.48 |
| 6,573,671 | B2* | 6/2003 | Montero et al. ................ | 318/53 |
| 7,925,454 | B1* | 4/2011 | Narcus ............................ | 702/34 |
| 2003/0006725 | A1* | 1/2003 | Otsuka et al. ................. | 318/268 |
| 2009/0063057 | A1* | 3/2009 | Miettinen ....................... | 702/34 |
| 2009/0110416 | A1* | 4/2009 | Thayer et al. .................. | 399/34 |

OTHER PUBLICATIONS

Kim, S. & Claassen, A., "How to evaluate fan life", May 1, 1996 Electronics Cooling Magazine, pp. 1-9, http://www.electronics-cooling.com/1996/05/how-to-evaluate-fan-life/.*
Western Digital, "Thermal Reliability", 2005, Western Digital Technologies, Inc., pp. 1-6.*
Kuo, L., Tsai, L. and Wang, M., Nov. 16, 2008 SOFASCO Inc. MTTF Report, p. 1, http://www.sofasco.com/mttf/SOFASCO_DF25098V12.pdf.*
Pasha et al., "Empirical Analysis of the Weibull Distribution for Failure Data", 2006, Journal of Statistics, vol. 13 No. 1, pp. 33-45, ISSN 1684-8403.*
Azevedo, Ann, "The Risk Analysis Correspondence Course", no date, no publisher, pp. 1-21.*
Lifetime Reliability Solutions, "Do a Timeline Distribution Before doing a Weibull Failure Analysis", no date, no publisher, pp. 1-9.*

(Continued)

*Primary Examiner* — Mischita Henson
(74) *Attorney, Agent, or Firm* — Morris Manning & Martin LLP; Tim Tingkang Xia, Esq.

(57) ABSTRACT

A method for estimating a fan life includes the following steps. Fans to be checked at a number of M are provided. A working temperature and a test temperature of a fan are set, and the test temperature is greater than the working temperature. An acceleration factor is set, which has a fixed value. The fans are kept in an operating state at the test temperature, and a number of the damaged fans is detected and recorded at intervals of a check time, until N damaged fans are detected. A distribution of time points when the fans are damaged is simulated with a Weibull distribution model, and a shape parameter and a characteristic life of the Weibull distribution model are calculated. A life value of the fans at the test temperature is calculated. A life value of the fans at the working temperature is calculated by using the acceleration factor.

22 Claims, 2 Drawing Sheets

OTHER PUBLICATIONS

Yang, N and Liu, G.L., "DC Fan Life Experiment Report", Apr. 24, 2006 Delta Electronics, Inc., pp. 1-3.*

Technical Paper, "How to Determine Fan Life", no date, Cooltron, pp. 1-2.*

Jin, X., Ma, E.W.M., Chow, T. and Pecht, M., "An Investigation into Fan Reliability", 2012, IEEE, 2012 Prognostics & System Health Management Conference, 978-1-4577-1911-0/12, pp. MU3274.*

* cited by examiner

METHOD FOR ESTIMATING FAN LIFE

CROSS-REFERENCE TO RELATED APPLICATIONS

This non-provisional application claims priority under 35 U.S.C. §119(a) on Patent Application No(s). 098140224 filed in Taiwan, R.O.C. on Nov. 25, 2009, the entire contents of which are hereby incorporated by reference.

BACKGROUND OF THE INVENTION

1. Field of the Invention

The present invention relates to a method for estimating a product life, and more particularly to a method for estimating a fan life.

2. Related Art

In recent years, with the rapid progress of computer technology, the operating speed of the computer is continuously increased, and the heat generation rate of electronic elements in the computer also rises accordingly. In order to prevent the electronic elements in the computer from getting overheated to cause a temporary or permanent failure to the electronic elements, a heat dissipation module is placed in the computer in the prior art, so as to dissipate the heat generated by the electronic elements out of the computer.

In the electronic elements, a central processing unit (CPU) is a main heat generation source among the electronic elements of the computer. When the CPU is operating at a high speed, if the temperature of the CPU exceeds a normal working temperature range, an operation error may easily occur to the CPU, or the CPU is temporarily failed, resulting in a breakdown of the computer. In addition, when the temperature of the CPU far exceeds the normal working temperature range, transistors in the CPU may be easily damaged and cause permanent failure to the CPU.

Therefore, when the computers are manufactured, in order to ensure a normal operation of the heat dissipation module assembled in the computer within a warranty period, manufacturers of the computers need to accurately estimate a fan life in the heat dissipation modules.

SUMMARY OF THE INVENTION

In order to solve the above problems, the present invention is a method for estimating a fan life, so as to accurately estimate the fan life.

The method for estimating a fan life comprises the following steps. Fans to be checked at a number of M are provided, in which M is a positive integer. A working temperature and a test temperature of a fan are set, and the test temperature is greater than the working temperature. An acceleration factor is set, which has a fixed value. The fans are kept in an operating state at the test temperature, and a number of the damaged fans is detected and recorded at intervals of a check time, until N damaged fans are detected, in which N≧0.1M and N is a positive integer. A distribution of time points when the fans are damaged is simulated with a Weibull distribution model, and a shape parameter (β) and a characteristic life (α) of the Weibull distribution model are calculated, in which the Weibull distribution model is $$F(t) = 1 - e^{-\left(\frac{t}{\alpha}\right)^\beta}$$

A life value of the fans at the test temperature is calculated. A life value of the fans at the working temperature is calculated by using the acceleration factor.

In view of the above, in the present invention, the life value of the fans at the working temperature may be accurately estimated through the life value of the fans at the test temperature. In this manner, when a designer of an electronic device determines which fan to be adopted through evaluation, the designer may calculate and compare life values of fans of various brands at the working temperature by using the above method.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
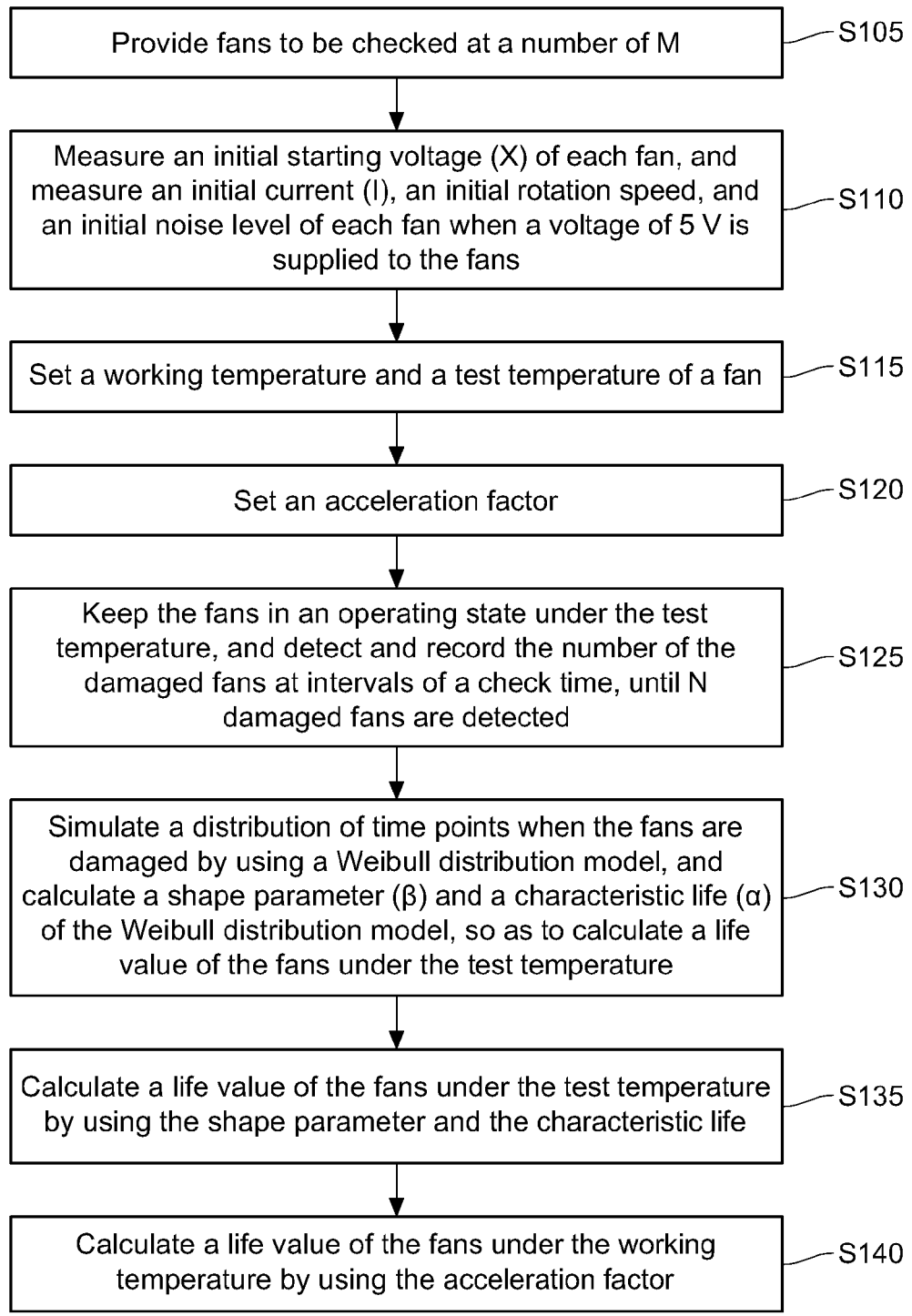
FIG. 1 is a method for estimating a fan life according to an embodiment of the present invention.

FIG. 1 is a method for estimating a fan life according to an embodiment of the present invention. Referring to FIG. 1, firstly, in Step S105, fans to be checked at a number of M are provided, in which M is a positive integer. In this embodiment, the number M of the fans is, for example, 50. Then, in Step S110, an initial starting voltage (X) of each fan is measured. Moreover, in this embodiment, if a voltage of 5 V is supplied to the fans, an initial current (I), an initial rotation speed, and an initial noise level of each fan are measured. In addition, in this embodiment, the fans are driven in a pulse width modulation (PWM) mode by a power supply or a signal generator, and an initial response value generated by each fan to the power supply is measured.

Afterward, in Step S115, a working temperature (W) and a test temperature (T) are set. The test temperature is greater than the working temperature, and a difference value (T−W) between the test temperature and the working temperature is a multiple of 10. In this embodiment, the working temperature is 60° C., and the test temperature is, for example, a temperature in a range of 80° C. to 100° C.

Next, in Step S120, an acceleration factor φ is set, which has a fixed value. In this embodiment, the acceleration factor φ is defined to be increasing a number of hours by more than D times for each temperature drop of 10° C., and D is a numeral greater than 1.1, for example, D is 1.5.

Figure 2:
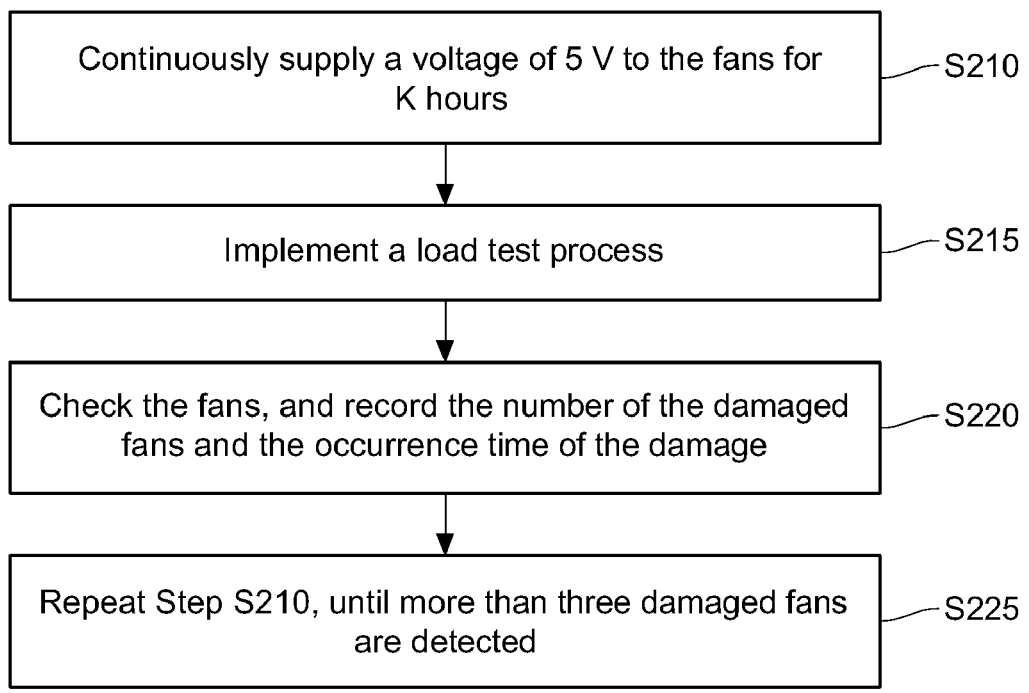
FIG. 2 is a schematic flow chart of Step S125 in FIG. 1.

Then, in Step S125, at the test temperature, the fans are kept in an operating state, and a number of the damaged fans is detected and recorded at intervals of a check time, until N damaged fans are detected, in which N≧3 and N is a positive integer, for example, N is 3. The above test method is introduced in detail below. FIG. 2 is a schematic flow chart of Step S125 in FIG. 1. Referring to FIG. 2, firstly, in Step S210, a voltage of 5 V is continuously supplied to the fans for K hours, in which K is a fixed value randomly selected from a range of 200 to 350.

Next, in Step S215, a load test process is implemented, which comprises the following steps. The fans are driven in the PWM mode, such that the fans perform a load cycle for several times. In each load cycle of this embodiment, a voltage of 5 V is continuously supplied to the fans for 120 seconds, and then the voltage supply is stopped for 10 seconds. In this embodiment, the times of the load cycle is greater than 10.

Afterward, in Step S220, the fans are checked, and the number of the damaged fans and the occurrence time of the damage to each fan are recorded. The fan is determined to be damaged when one of the following conditions is satisfied.

a. When a starting voltage of the fan is increased from the initial starting voltage (X) to above (X+0.5) V, it is determined that the fan is damaged;

b. When a load of PWM is higher than 5% of the initial value, it is determined that the fan is damaged;

c. When a voltage of 5V is supplied to the fan and a current value of the fan is higher than 1.15 times of the initial current (i.e., 1.15I), it is determined that the fan is damaged;

d. When a voltage of 5V is supplied to the fan and a rotation speed of the fan is higher than 1.15 times of the initial rotation speed, it is determined that the fan is damaged; and e. When a voltage of 5V is supplied to the fan and the fan generates abnormal noises or a noise level of the fan exceeds the initial noise level for 3 dBA, it is determined that the fan is damaged.

Then, in Step S225, Step S210 is repeated, until more than three damaged fans are detected. In this embodiment, the test ends until more than five damaged fans are detected.

Further referring to FIG. 1, after the procedure of Step 125 is finished, in Step S130, a distribution of time points when the fans are damaged is simulated with a Weibull distribution model, and a shape parameter (β) and a characteristic life (α) of the Weibull distribution model are calculated, in which the shape parameter (β) is required to be greater than 1. Therefore, a life value of the fans at the test temperature is calculated. A life value of the fans at the working temperature is calculated by using the acceleration factor φ. The Weibull distribution model is $$F(t) = 1 - e^{-\left(\frac{t}{\alpha}\right)^\beta}$$

Where t represents a time point;
α represents the characteristic life; and
β represents the shape parameter.

Next, in Step S135, a life value of the fans at the test temperature is calculated by using the shape parameter (β) and the characteristic life (α). In this embodiment, the life value of the fans at the test temperature is a mean time to failure (MTTF), $$MTTF = \alpha \times \Gamma\left(1 + \frac{1}{\beta}\right)$$

and Γ is a Gamma function. Afterwards, in Step S140, the life value of the fans at the working temperature is calculated by using the acceleration factor φ. In this embodiment, a life value (A) of the fans at the working temperature is calculated by using the acceleration factor φ and the MTTF, in which $$A = MTTF \times (1.5)^\phi$$

where $$\phi = \left(\frac{T-W}{10}\right)$$

T represents the test temperature; and
W represents the working temperature, and a difference value of T−W is a multiple of 10.

It should be noted that, if a designer calculates the life value of the fans at the working temperature by using the MTTF, in this embodiment, the shape parameter (β) needs to be greater than or equal to 3.

Although the MTTF serves as the life value of the fans at the test temperature, the above embodiment is not intended to limit the present invention. In another embodiment of the present invention, the life value of the fans at the test temperature may also be denoted by a product life expected value (Life 10, L10), in which the product life expected value (L10) refers to an expected time when the product generates a defect of 10%, $$L_{10} = \alpha \times (0.10536)^\mu$$

and $$\mu = 1/\beta$$

Here, a life value (B) of the fans at the working temperature is:

$$B = L_{10} \times (1.5)^\phi$$

in which $$\phi = \left(\frac{T-W}{10}\right)$$

where T represents the test temperature; and
W represents the working temperature.

In view of the above, in the present invention, the life value of the fans at the working temperature may be accurately estimated through the life value of the fans at the test temperature. In this manner, when a designer of an electronic device determines which fan to be adopted through evaluation, the designer may calculate and compare life values of fans of various brands at the working temperature by using the above method.

What is claimed is:

1. A method for estimating a fan life, comprising:
providing fans to be checked at a number of M, wherein M is a positive integer;
setting a working temperature and a test temperature of the fans, wherein the test temperature is greater than the working temperature;
setting an acceleration factor, wherein the acceleration factor has a fixed value;
keeping the fans in an operating state under the test temperature, and detecting and recording a number of the damaged fans at intervals of a check time, until N damaged fans are detected, wherein N≧3 and N is a positive integer, comprising:
(a) continuously supplying a voltage of 5V to the fans for K hours,
wherein K is a positive constant;
(b) implementing a load test process, for driving the fans in a pulse width modulation (PWM) mode to perform a load cycle greater than 10 times, wherein in each load cycle, the voltage of 5 V is continuously supplied to the fans for a first period, and then the voltage of 5 V is stopped for a second period;
(c) checking the fans, and recording the number of the damaged fans and a occurrence time of the damage, wherein the fans are determined to be damaged when at least one condition selected from the group consisting of a first condition and a second condition is satisfied, the first condition is where a starting voltage of one of the fans increases from an initial starting voltage (X) to (X+0.5) volts, and the second condition is where the voltage of 5 V is supplied to the fans and a rotation speed of one of the fan is larger than 1.15 times of an initial rotation speed; and (d) repeating the steps (a) to (c), until N or more damaged fans are detected;

simulating a distribution of time points when the fans are damaged with a Weibull distribution model, and calculating a shape parameter ($\beta$) and a characteristic life ($\alpha$) of the Weibull distribution model, wherein the Weibull distribution model is $$F(t) = 1 - e^{-\left(\frac{t}{\alpha}\right)^\beta}$$

and the shape parameter ($\beta$) is greater than 1;

calculating a life value of the fans at the test temperature by using the shape parameter and the characteristic life; and calculating a life value of the fans at the working temperature by using the acceleration factor.

2. The method for estimating the fan life according to claim 1, wherein the acceleration factor is increasing a number of hours by more than D times for each temperature drop of 10° C., and D is a numeral greater than 1.1.

3. The method for estimating the fan life according to claim 2, wherein the life value of the fans at the test temperature is a mean time to failure (MTTF), $$MTTF = \alpha \times \Gamma\left(1 + \frac{1}{\beta}\right)$$

and $\Gamma$ is a Gamma function.

4. The method for estimating the fan life according to claim 3, wherein the life value (A) of the fans at the working temperature is $A = \text{MTTF} \times (1.5)^\phi$ where $$\phi = \left(\frac{T-W}{10}\right)$$

T is the test temperature, W is the working temperature, and a difference value of T−W is a multiple of 10.

5. The method for estimating the fan life according to claim 2, wherein the life value of the fans at the test temperature is a product life expected value ($L_{10}$), $L_{10} = \alpha \times (0.10536)^\mu$ and $\mu = 1/\beta$.

6. The method for estimating the fan life according to claim 5, wherein the life value (B) of the fans at the working temperature is $B = L_{10} \times (1.5)^\phi$ and $$\phi = \left(\frac{T-W}{10}\right)$$

T is the test temperature, W is the working temperature, and a difference value of T−W is a multiple of 10.

7. The method for estimating the fan life according to claim 1, wherein K is randomly selected from a range of 200 to 350.

8. The method for estimating the fan life according to claim 7, wherein the first period is 120 seconds, and the second period is 10 seconds.

9. A method for estimating a fan life, comprising:

providing fans to be checked at a number of M, wherein M is a positive integer;

setting a working temperature and a test temperature of the fans, wherein the test temperature is greater than the working temperature;

setting an acceleration factor, wherein the acceleration factor has a fixed value;

keeping the fans in an operating state under the test temperature, and detecting and recording a number of the damaged fans at intervals of a check time, until N damaged fans are detected, wherein N≧3 and N is a positive integer, the fans are regarded as being damaged when at least one condition selected from a group consisting of a first condition and a second condition is satisfied, the first condition is where a starting voltage of one of the fans increases from an initial starting voltage (X) to (X+0.5) V, and the second condition is where a working voltage is supplied to the fans for K hours and a rotation speed of one of the fan is larger than 1.15 times of an initial rotation speed, wherein K is a positive constant;

simulating a distribution of time points when the fans are damaged with a Weibull distribution model, and calculating a shape parameter ($\beta$) and a characteristic life ($\alpha$) of the Weibull distribution model, wherein the Weibull distribution model is $$F(t) = 1 - e^{-\left(\frac{t}{\alpha}\right)^\beta}$$

and the shape parameter ($\beta$) is greater than 1;

calculating a life value of the fans at the test temperature by using the shape parameter and the characteristic life; and calculating a life value of the fans at the working temperature by using the acceleration factor.

10. The method for estimating the fan life according to claim 9, wherein the acceleration factor is adapted to increase a number of hours by more than D times for each temperature drop of 10° C., and D is a numeral greater than 1.1.

11. The method for estimating the fan life according to claim 9, wherein the life value of the fans at the test temperature is a mean time to failure (MTTF), $$MTTF = \alpha \times \Gamma\left(1 + \frac{1}{\beta}\right)$$

and $\Gamma$ is a Gamma function.

12. The method for estimating the fan life according to claim 9, wherein the life value (A) of the fans at the working temperature is $A = \text{MTTF} \times (1.5)^\phi$ where $$\phi = \left(\frac{T-W}{10}\right)$$

T is the test temperature, W is the working temperature, and a difference value of T−W is a multiple of 10.

13. The method for estimating the fan life according to claim 9, wherein the life value of the fans at the test temperature is a product life expected value (L10), $$L_{10} = \alpha \times (0.10536)^\mu$$

and $$\mu = 1/\beta.$$

14. The method for estimating the fan life according to claim 9, wherein the life value (B) of the fans at the working temperature is $$B = L_{10} \times (1.5)^\phi$$

and $$\phi = \left(\frac{T-W}{10}\right)$$

T is the test temperature, W is the working temperature, and a difference value of T−W is a multiple of 10.

15. The method for estimating the fan life according to claim 9, wherein K ranges from 200 to 350.

16. A method for estimating a fan life, comprising:
providing fans to be checked at a number of M, wherein M is a positive integer;
setting a working temperature and a test temperature of the fans, wherein the test temperature is greater than the working temperature;
setting an acceleration factor, wherein the acceleration factor has a fixed value;
keeping the fans in an operating state under the test temperature, and detecting and recording a number of the damaged fans at intervals of a check time, until N damaged fans are detected, wherein N≧3 and N is a positive integer, the fans are considered as being damaged when at least one condition selected from a group consisting of a first condition and a second condition is satisfied, the first condition is where a starting voltage of one of the fans increases from an initial starting voltage (X) to (X+0.5) Volts, and the second condition is where a voltage of 5V is supplied to the fans for K hours and a rotation speed of one of the fan is higher than 1.15 times of an initial rotation speed, wherein K is a positive constant;
simulating a distribution of time points when the fans are damaged with a Weibull distribution model, and calculating a shape parameter (β) and a characteristic life (α) of the Weibull distribution model, wherein the Weibull distribution model is $$F(t) = 1 - e^{-\left(\frac{t}{\alpha}\right)^\beta}$$

and the shape parameter (β) is greater than 1;
calculating a life value of the fans at the test temperature by using the shape parameter and the characteristic life; and
calculating a life value of the fans at the working temperature by using the acceleration factor.

17. The method for estimating the fan life according to claim 16, wherein the acceleration factor is adapted to increase a number of hours by more than D times for each temperature drop of 10° C., and D is a numeral greater than 1.1.

18. The method for estimating the fan life according to claim 16, wherein the life value of the fans at the test temperature is a mean time to failure (MTTF), $$MTTF = \alpha \times \Gamma\left(1 + \frac{1}{\beta}\right)$$

and Γ is a Gamma function.

19. The method for estimating the fan life according to claim 16, wherein the life value (A) of the fans at the working temperature is $$A = MTTF \times (1.5)^\phi$$

where $$\phi = \left(\frac{T-W}{10}\right)$$

T is the test temperature, W is the working temperature, and a difference value of T−W is a multiple of 10.

20. The method for estimating the fan life according to claim 16, wherein the life value of the fans at the test temperature is a product life expected value (L10), $$L_{10} = \alpha \times (0.10536)^\mu$$

and $$\mu \times 1/\beta.$$

21. The method for estimating the fan life according to claim 16, wherein the life value (B) of the fans at the working temperature is $$B = L_{10} \times (1.5)^\phi$$

and $$\phi = \left(\frac{T-W}{10}\right)$$

T is the test temperature, W is the working temperature, and a difference value of T−W is a multiple of 10.

22. The method for estimating the fan life according to claim 16, wherein K ranges from 200 to 350.

* * * * *